United States Patent [19]
Koga

[11] Patent Number: 6,085,109
[45] Date of Patent: Jul. 4, 2000

[54] WIRELESS TELEPHONE EQUIPMENT OPERATING AS A CORDLESS AND CELLULAR TELEPHONE

[75] Inventor: Toshihiro Koga, Kasuga, Japan

[73] Assignee: Matsushita Electric Industrial Co., Ltd., Japan

[21] Appl. No.: 08/048,188

[22] Filed: Apr. 20, 1993

[30] Foreign Application Priority Data

Apr. 30, 1992 [JP] Japan .................................. 4-111187

[51] Int. Cl.[7] .................................................. H04Q 7/20
[52] U.S. Cl. ......................... 455/552; 455/102; 455/103; 455/553
[58] Field of Search ................................ 379/58, 59, 61; 455/76, 77, 103, 120, 126, 260, 314, 315, 422, 432, 426, 436, 550, 552, 553, 575, 90, 102, 180.1, 188.1, 189.1, 337, 340

[56] References Cited

U.S. PATENT DOCUMENTS

| | | | |
|---|---|---|---|
| 4,618,997 | 10/1986 | Imazeki et al. | 455/77 |
| 4,776,040 | 10/1988 | Ichikawa et al. | 455/315 |
| 4,989,230 | 1/1991 | Giling et al. | 379/59 |
| 5,144,258 | 9/1992 | Nakanishi et al. | 455/126 |
| 5,196,806 | 3/1993 | Ichihara | 455/126 |
| 5,212,684 | 5/1993 | MacNamee et al. | 379/61 |
| 5,260,988 | 11/1993 | Schellinger et al. | 379/59 |
| 5,297,203 | 3/1994 | Rose et al. | 379/61 |

*Primary Examiner*—Dwayne D. Bost
*Assistant Examiner*—Nay Maung
*Attorney, Agent, or Firm*—Rossi & Associates

[57] ABSTRACT

A wireless telephone equipment is provided with a microphone for receiving voice of a user and changing the voice to audio signals of an outgoing call, a cellular transmitter for modulating a carrier with the audio signals in a cellular communication, a cellular band-pass filter for filtering the carrier modulated in the cellular transmitter, a cordless transmitter for modulating a carrier with the audio signals in a cordless communication, a cordless band-pass filter for filtering the carrier modulated in the cordless transmitter, an antenna for transmitting the carrier filtered in the cellular or cordless band-pass filter and receiving a modulated signal, a band-pass filter for filtering the modulated signal, a cellular-cordless receiver for demodulating the modulated signal filtered to reproduce audio signals of an incoming call in the cellular communication and cordless communication, and a speaker for receiving the audio signals of the incoming call and giving voice. In cases where the equipment is positioned within call range of a cordless base station, the cordless communication is performed.

9 Claims, 6 Drawing Sheets

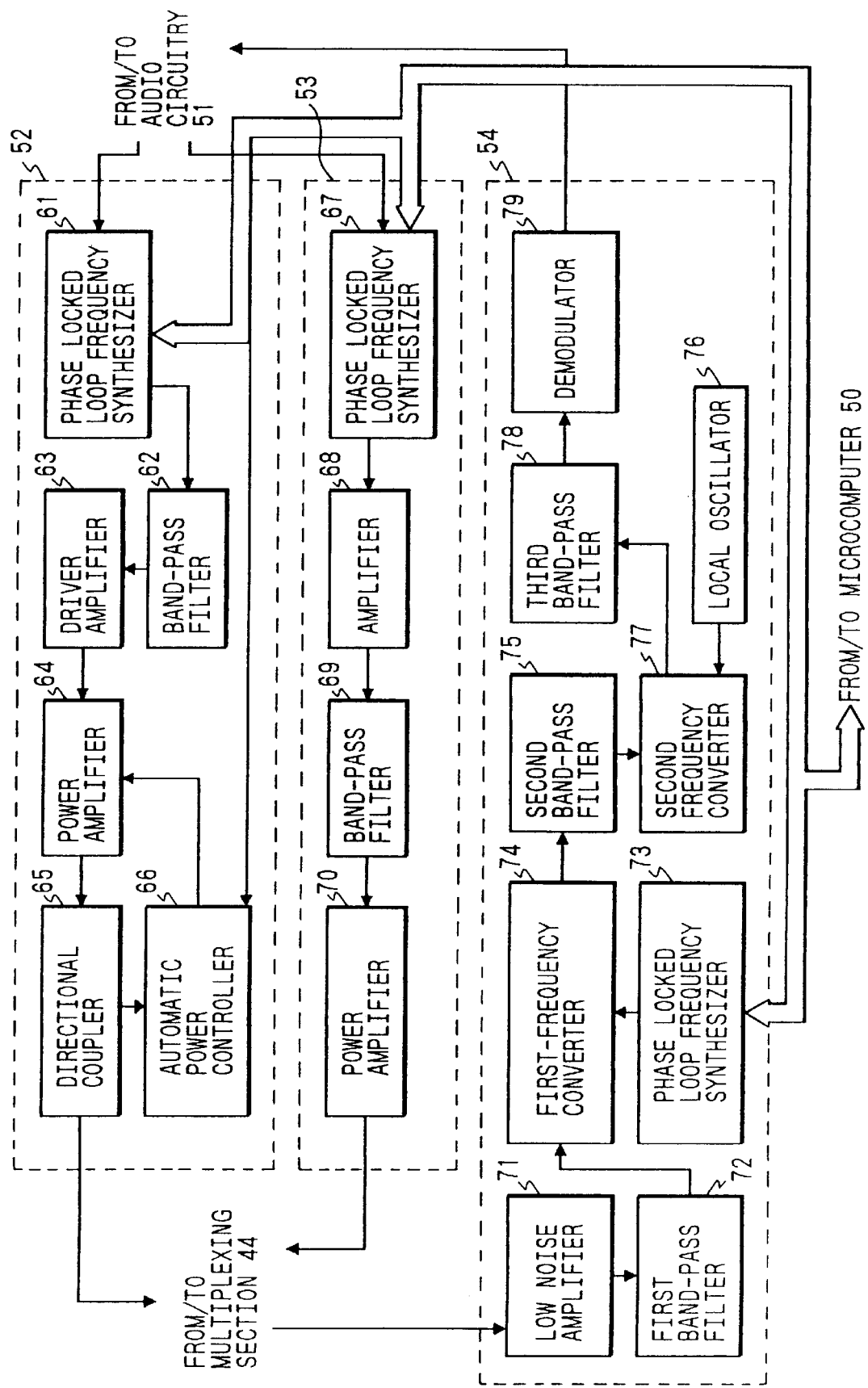

WIRELESS TELEPHONE EQUIPMENT OPERATING AS A CORDLESS AND CELLULAR TELEPHONE

BACKGROUND OF THE INVENTION

1. Field of the Invention

The present invention relates generally to a wireless telephone equipment, and more particularly to an improved wireless telephone equipment which operates as a cordless telephone within call range of a base unit of a cordless telephone system and operates as a cellular telephone out of the call range of the cordless telephone.

2. Description of the Related Art

A cellular telephone equipment has been recently used because a user can place and receive telephone calls at any time and at any place. Also, a cordless telephone equipment in which radio transmission is performed in place of wire communication.

In the prior art, a cordless telephone system is provided with a cordless base station and at least one portable unit of cordless telephone equipment. The cordless base station is connected to a wire telephone line, and the radio transmission is performed between the cordless base station and the portable unit of cordless telephone equipment. For example, in cases where the cordless base station is set in the home, the portable unit is used in a surrounding area of the home to allow the user to place and receive telephone calls. The surrounding area is usually a circular area up to several hundreds of meters in radius for clear reliable communication. In this case, the cost of a cordless telephone call is the same as the cost of a wire telephone call because the telephone communication is performed through a subscriber's telephone line.

In contrast, a cellular telephone area is divided into a large number of cells in a cellular telephone system in which cellular telephone communication is performed by utilizing the cellular telephone equipment. In this case, a cellular telephone base station is arranged at each of the cells. For example, in cases where a user positioned in a surrounding area of one of the cellular telephone base stations places a telephone call by using the cellular telephone equipment, the telephone call is transmitted to the cellular phone base station. The surrounding area is usually a circular area ranging from several kirometers to tens of kirometers in radius for clear reliable communication. Therefore, the cellular telephone equipment can be used in any cell to allow the user to place and receive telephone calls. However, the cost of a cellular telephone call is considerably higher than the cost of the wire telephone call because a large number of cellular telephone base stations must be arranged at the cells of which the intervals range from several kirometers to tens of kirometers.

Therefore, a cellular and cordless telephone equipment which can operate as both a cellular telephone equipment and a portable unit of cordless telephone equipment has been proposed. The cellular and cordless telephone equipment automatically or manually operates as the cordless telephone equipment within call range of a cordless base station of a cellular and cordless telephone system. The cellular and cordless telephone equipment was laid open to public inspection under Provisional Publication No. 1621/91 (H31621).

2.1. Previously Proposed Art

The conventional cellular and cordless telephone equipment laid open to public inspection under Provisional Publication No. 1621/91 is described with reference to FIGS. 1, to 3.

FIG. 1 is a block diagram of the conventional cellular and cordless telephone equipment. FIG. 2 is a block diagram of both a cordless telephone transceiver and a cellular telephone transceiver included in the conventional cellular and cordless telephone equipment shown in FIG. 1.

As shown in FIG. 1, the conventional cellular and cordless telephone equipment 11 includes a microphone 12, a speaker 13, an audio switch 14 for switching from a cellular side (a cordless side) to the cordless side (the cellular side), a microcomputer 15 for controlling the conventional cellular and cordless telephone equipment 11, a cordless telephone transceiver 16 arranged at the cordless side, a cellular telephone transceiver 17 arranged at the cellular side, a key-pad 18, and a display 19.

The cordless telephone transceiver 16 includes a cordless side antenna 20, a cordless receiver 21 for receiving a modulated signal of an incoming call through the antenna 20, a cordless transmitter 22 for transmitting a modulated signal of an outgoing call through the antenna 20, and an audio circuitry 23 for amplifying an audio signal to give voice from the speaker 13 or amplifying an audio signal received in the microphone 12 to modulate the audio signal in the cordless transmitter 22.

The cellular telephone transceiver 17 includes a cellular side antenna 24, a cellular receiver 25 for receiving a modulated signal of an incoming call through the antenna 24, a cellular transmitter 26 for transmitting a modulated signal of an outgoing call through the antenna 24, and an audio circuitry 27 for amplifying an audio signal to give voice from the speaker 13 or amplifying an audio signal received in the microphone 12 to modulate the audio signal in the cellular transmitter 26.

As shown in FIG. 2, the cordless receiver 21 includes a band-pass filter 28 for filtering the modulated signal of the incoming call transmitted from the antenna 20, and a demodulator 29 for demodulating the modulated signal filtered to produce the audio signal. The audio signal produced in the demodulator 29 is amplified in the audio circuitry 23. The cordless transmitter 22 includes a modulator 30 for modulating a carrier with the audio signal amplified in the audio circuitry 23 to produce the modulated signal of the outgoing call, and a band-pass filter 31 for filtering the modulated signal produced in the modulator 30. The modulated signal received in the antenna 20 is transferred to the cordless receiver 21 through a coupling circuitry 32, and the modulated signal filtered in the band-pass-pass filter 31 is transferred to the antenna 20 through the coupling circuitry 32.

Also, the cellular receiver 25 includes a band-pass filter 33 for filtering the modulated signal of the incoming call transmitted from the antenna 24, and a demodulator 34 for demodulating the modulated signal filtered to produce the audio signal. The audio signal produced in the demodulator 34 is amplified in the audio circuitry 27. The cellular transmitter 26 includes a modulator 35 for modulating a carrier with the audio signal amplified in the audio circuitry 27 to produce the modulated signal of the outgoing call, and a band-pass filter 36 for filtering the modulated signal produced in the modulator 35. The modulated signal received in the antenna 24 is transferred to the cellular receiver 25 through a coupling circuitry 37, and the modulated signal filtered in the band-pass filter 36 is transferred to the antenna 24 through the coupling circuitry 37.

In the above configuration, in cases where the conventional cellular and cordless telephone equipment 11 is positioned within call range of a cordless base station of the cellular and cordless telephone system, the equipment 11 automatically operates as a portable unit of the cordless telephone equipment under control of the microcomputer 15. That is, the cordless telephone transceiver 16 is set in an operating condition, while the cellular telephone transceiver 17 is set in a non-operating condition. Also, the audio switch 14 is switched to the cordless side. That is, a terminal A connected to the speaker 13 is connected with a terminal A2 connected to the audio circuitry 23, and a terminal B connected to the microphone 12 is connected with a terminal B2 connected to the audio circuitry 23.

Therefore, voice of the user is transferred to the audio circuitry 23 as an audio signal through the microphone 12 and the audio switch 14. After the audio signal is amplified in the audio circuitry 23, a carrier is modulated with the audio signal amplified to a modulated signal in the modulator 30, and the modulated signal is filtered in the band-pass filter 31. As shown in FIG. 3, a frequency of the modulated signal filtered in the band-pass filter 31 ranges from 49.67 MHz to 49.99 MHz. Therefore, the modulated signal of which the frequency ranges from 49.67 MHz to 49.99 MHz is transmitted from the antenna 20 to the cordless base station of the cellular and cordless telephone system.

Also, a modulated signal transmitted from the cordless base station is received in the antenna 20. Thereafter, the modulated signal is filtered in the band-pass filter 28 as shown in FIG. 3. That is, a frequency of the modulated signal filtered in the band-pass filter 28 ranges from 46.61 MHz to 46.93 MHz. Thereafter, the modulated signal filtered is demodulated in the demodulator 29 to produce an audio signal. The audio signal is transferred to the speaker 13 through the audio circuitry 23 and the audio switch 14. Therefore, the user can hear voice of a sender.

In contrast, in cases where the conventional cellular and cordless telephone equipment 11 moves out of the call range of a cordless base station of the cellular and cordless telephone system, the equipment 11 automatically operates as a cellular telephone equipment under control of the microcomputer 15. That is, the cordless telephone transceiver 16 is set in a non-operating condition, while the cellular telephone transceiver 17 is set in an operating condition. Also, the audio switch 14 is switched to the cellular side. That is, the terminal A is connected with a terminal A1 connected to the audio circuitry 27, and the terminal B is connected with a terminal B1 connected to the audio circuitry 27.

Therefore, voice of the user is transferred to the audio circuitry 27 as an audio signal through the microphone 12 and the audio switch 14. After the audio signal is amplified in the audio circuitry 27, a carrier is modulated with the audio signal amplified to a modulated signal in the modulator 35, and the modulated signal is filtered in the band-pass filter 36. As shown in FIG. 3, a frequency of the modulated signal filtered in the band-pass filter 36 ranges from 824 MHz to 849 MHz. Therefore, the modulated signal of which the frequency ranges from 824 MHz to 849 MHz is transmitted from the antenna 24 to a cellular telephone base station of the cellular and cordless telephone system.

Also, a modulated signal transmitted from the cellular telephone base station is received in the antenna 24. Thereafter, the modulated signal is filtered in the band-pass filter 33 as shown in FIG. 3. That is, a frequency of the modulated signal filtered in the band-pass filter 33 ranges from 869 MHz to 894 MHz. Thereafter, the modulated signal filtered is demodulated in the demodulator 34 to produce an audio signal. The audio signal is transferred to the speaker 13 through the audio circuitry 27 and the audio switch 14. Therefore, the user can hear voice of a sender.

It is preferred that an antenna 38 be utilized in place of the antennas 20, 24. In this case, a low-pass filter 39 is provided for the cordless telephone transceiver 16, and a high-pass filter 40 is provided for the cellular telephone transceiver 17.

Accordingly, the conventional cellular and cordless telephone equipment 11 can automatically operate as the portable unit of the cordless telephone equipment under control of the microcomputer 15 in cases where the equipment 11 is positioned within the call range of the cordless base station of the cellular and cordless telephone system.

Also, the conventional cellular and cordless telephone equipment 11 can automatically operate as the cellular telephone equipment under control of the microcomputer 15 even though the equipment 11 moves out of the call range of the cordless base station of the cellular and cordless telephone system.

2—2 Problems to be Solved by the Invention

However, the cordless side antenna 20, the cordless receiver 21, the cordless transmitter 22, and the audio circuitry 23 are required for the conventional cellular and cordless telephone equipment 11 to operate as the portable unit of the cordless telephone equipment. Also, the cellular side antenna 24, the cellular receiver 25, the cellular transmitter 26, and the audio circuitry 27 are required for the conventional cellular and cordless telephone equipment 11 to operate as the cellular telephone equipment. In addition, the cordless transceiver 16 is provided with the base-band filters 28, 31, and the cellular transceiver 25 is provided with the base-band filters 33, 36. As a result, the size of the equipment 11 becomes large, while a small-sized cellular and cordless telephone equipment is required from a standpoint of the portability. Also, the weight of the equipment 11 becomes heavy, while a lightweight cellular and cordless telephone equipment is required from a standpoint of the portability. In addition, the equipment 11 becomes expensive, while a cheap cellular and cordless telephone equipment is required from a standpoint of the prevalence.

SUMMARY OF THE INVENTION

An object of the present invention is to provide, with due consideration to the drawbacks of such a conventional cellular and cordless telephone equipment, a small-sized, lightweight, and cheap wireless telephone equipment which operates as both a cellular telephone equipment and a portable unit of cordless telephone equipment.

The above object is achieved by the provision of a wireless telephone equipment comprising:

receiving means for receiving a first information signal of outgoing call;

first transmitting means for modulating a first carrier with the first information signal received in the receiving means to produce a first modulated signal which is transmitted to a receiver, a frequency of the first carrier being in a first frequency band;

second transmitting means for modulating a second carrier with the first information signal received in the receiving means to produce a second modulated signal which is transmitted to the receiver, a frequency of the second carrier being in a second frequency band different from the first frequency band of the first carrier;

antenna means for transmitting either the first modulated signal produced in the first transmitting means or the second modulated signal produced in the second transmitting means and receiving a third modulated signal in which a third carrier is modulated with a second information signal of an incoming call, a frequency of the third carrier being in a third frequency band different from both the first frequency band of the first carrier and the second frequency band of the second carrier;

demodulating means for demodulating the third modulated signal received in the antenna means to reproduce the second information signal of the incoming call;

outputting means for outputting the second information signal reproduced in the demodulating means; and control means for controlling a first operation performed in the first transmitting means, a second operation performed in the second transmitting means, and a third operation performed in the demodulating means to perform one of the first, second and third operations.

In the above configuration, in cases where the first information signal of the outgoing call is processed in the equipment under control of the control means, the first information signal received in the demodulating means is transferred to the antenna means through either the first transmitting means or the second transmitting means under control of the control means. In this case, the first or second carrier is modulated with the first information signal in the first transmitting means or the second transmitting means to the first or second modulated signal. Thereafter, the first or second modulated signal is transmitted from the antenna means to a receiver.

In contrast, in cases where the second information signal of the incoming call is processed under control of the control means, the third modulated signal is received in the antenna means. Thereafter, the third modulated signal is demodulated in the demodulating means to reproduce the second information signal under control of the control means. In this case, the demodulating means is necessarily selected by the control means regardless of where the equipment is positioned. Thereafter, the second information signal is output from the output means.

Accordingly, because the demodulating means is necessarily utilized under control of the control means regardless of where the equipment is positioned, no more demodulating means is required to reproduce the second information signal of the incoming call. Therefore, a small-sized and lightweight wireless telephone equipment can be manufactured at moderate cost.

It is preferred that the first transmitting means operate in a cordless telephone communication, the second transmitting means operate in a cellular telephone communication, and the demodulating means operate in both the cordless telephone communication and the cellular telephone communication, the cordless telephone communication being performed under control of the control means in cases where the wireless telephone equipment is positioned within call range of a cordless base station, and the cellular telephone communication being performed under control of the control means in cases where the wireless telephone equipment is positioned out of the call range of the cordless base station.

In the above configuration, in cases where the wireless telephone equipment is positioned within the call range of the cordless base station, the wireless telephone equipment operates as a cordless telephone to perform the cordless telephone communication. In this case, the first transmitting means and the demodulating means operate under control of the control means. Also, the second transmitting means does not operate under control of the control means.

In contrast, in cases where the wireless telephone equipment is moved out of the call range of the cordless base station, the wireless telephone equipment operates as a cellular telephone to perform the cellular telephone communication. In this case, because the first modulated signal transmitted from the antenna means does not reach the cordless base station, the second modulated signal is transmitted from the antenna means to a cellular telephone base station in place of the first modulated signal. Therefore, the second transmitting means and the demodulating means operate under control of the control means. Also, the first transmitting means does not operate under control of the control means.

Accordingly, electric power consumed in the wireless telephone equipment can be reduced.

Also, it is preferred that the first transmitting means comprise a phase locked loop frequency synthesizer for modulating the first carrier with the first information signal to produce the first modulated signal, a band-pass filter for filtering the first information signal to eliminate unnecessary noises which are generated with the first modulated signal in the phase locked loop frequency synthesizer, and a power amplifier for amplifying a power level of the first modulated signal produced in the phase locked loop frequency synthesizer.

In the above configuration, the first information signal is changed to the first modulated signal to transmit from the antenna in the phase locked loop frequency synthesizer. Also, the unnecessary noises are eliminated in the band-pass filter. Therefore, the modulated signal has no noise. In addition, the modulated signal is amplified in the power amplifier. Therefore, the modulated signal can be reliably transmitted to a receiver.

Also, it is preferred that the second transmitting means comprise a phase locked loop frequency synthesizer for modulating the first carrier with the first information signal to produce the first modulated signal, a band-pass filter for filtering the first information signal to eliminate unnecessary noises which are generated with the first modulated signal in the phase locked loop frequency synthesizer, a power amplifier for amplifying a power level of the first modulated signal produced in the phase locked loop frequency synthesizer, a directional coupler for taking out a part of travelling-wave component of the modulated signal amplified in the power amplifier, and an automatic power controller for automatically controlling the power level of the modulated signal amplified in the power amplifier under control of the control means according to a power level of the modulated signal taken out in the directional coupler.

In the above configuration, the first information signal is changed to the first modulated signal to transmit from the antenna in the phase locked loop frequency synthesizer. Also, the unnecessary noises are eliminated in the band-pass filter. Therefore, the modulated signal has no noise. Also, the modulated signal is amplified in the power amplifier. Therefore, the modulated signal can be reliably transmitted to a receiver. In addition, a power level of the modulated signal amplified in the power amplifier is controlled by the cooperation of the directional coupler and the automatic power controller. Therefore, the modulated signal can be reliably transmitted to a sender through a base station even though the wireless telephone equipment is positioned far from the base station.

Also, it is preferred that the demodulating means comprise a first frequency converter for converting the frequency of the third carrier to an first intermediate frequency of a first intermediate-frequency signal, a first intermediate frequency band-pass filter for filtering the first intermediate-frequency signal to eliminate unnecessary noises which are generated with the first intermediate-frequency signal in the first frequency converter, a second frequency converter for converting the frequency of the first intermediate-frequency signal to a second intermediate frequency of a second intermediate-frequency signal, a second intermediate frequency band-pass filter for filtering the second intermediate-frequency signal to eliminate unnecessary noises which are generated with the second intermediate-frequency signal in the second frequency converter, and a demodulator for demodulating the second intermediate-frequency signal to reproduce the second information signal of the incoming call.

In the above configuration, the frequency of the third carrier of the second modulated signal is reduced in two stages in the first and second frequency converters. Therefore, receiving sensitivity of the second information signal can be stably enhanced.

Also, the unnecessary noises generated with the first and second intermediate-frequency signals are eliminated. Therefore, the second information signal reproduced in the demodulator has no noise.

In addition, it is preferred that a wireless telephone equipment additionally include:

a first transmitting band-pass filter for filtering the first modulated signal produced in the first transmitting means, the first modulated signal in the first frequency band of the first carrier passing through the first transmitting band-pass filter and being transferred to the antenna means;

a second transmitting band-pass filter for filtering the second modulated signal produced in the second transmitting means, the second modulated signal in the second frequency band of the second carrier passing through the second transmitting band-pass filter and being transferred to the antenna means; and a receiving band-pass filter for filtering the third modulated signal received in the antenna means, the third modulated signal in the third frequency band of the third carrier passing through the receiving band-pass filter and being transferred to the demodulating means.

In the above configuration, in cases where the first modulated signal is transferred from the first transmitting means to the antenna means under control of the control means, other signals ranging out of the first frequency band are eliminated in advance in the first transmitting band-pass filter.

Also, in cases where the second modulated signal is transferred from the second transmitting means to the antenna means under control of the control means, other signals ranging out of the second frequency band are eliminated in advance in the second transmitting band-pass filter.

Also, in cases where the third modulated signal is transferred from the antenna means to the demodulating means under control of the control means, other signals ranging out of the third frequency band are eliminated in advance in the receiving band-pass filter.

Therefore, unnecessary signals are not transmitted to a receiver. Also, unnecessary signals received in the antenna means are interrupted in advance before the third modulated signal is transferred to the demodulating means.

BRIEF DESCRIPTION OF THE DRAWINGS

The objects, features and advantages of the present invention will be apparent from the following description taken in conjunction with the accompanying drawings, in which:

FIG. 6 is a block diagram showing a transceiver section of the wireless telephone equipment shown in FIG. 4 in detail.

DETAIL DESCRIPTION OF THE PREFERRED EMBODIMENT

A preferred embodiment of a wireless telephone equipment according to the present invention is described with reference to drawings.

Figure 1:
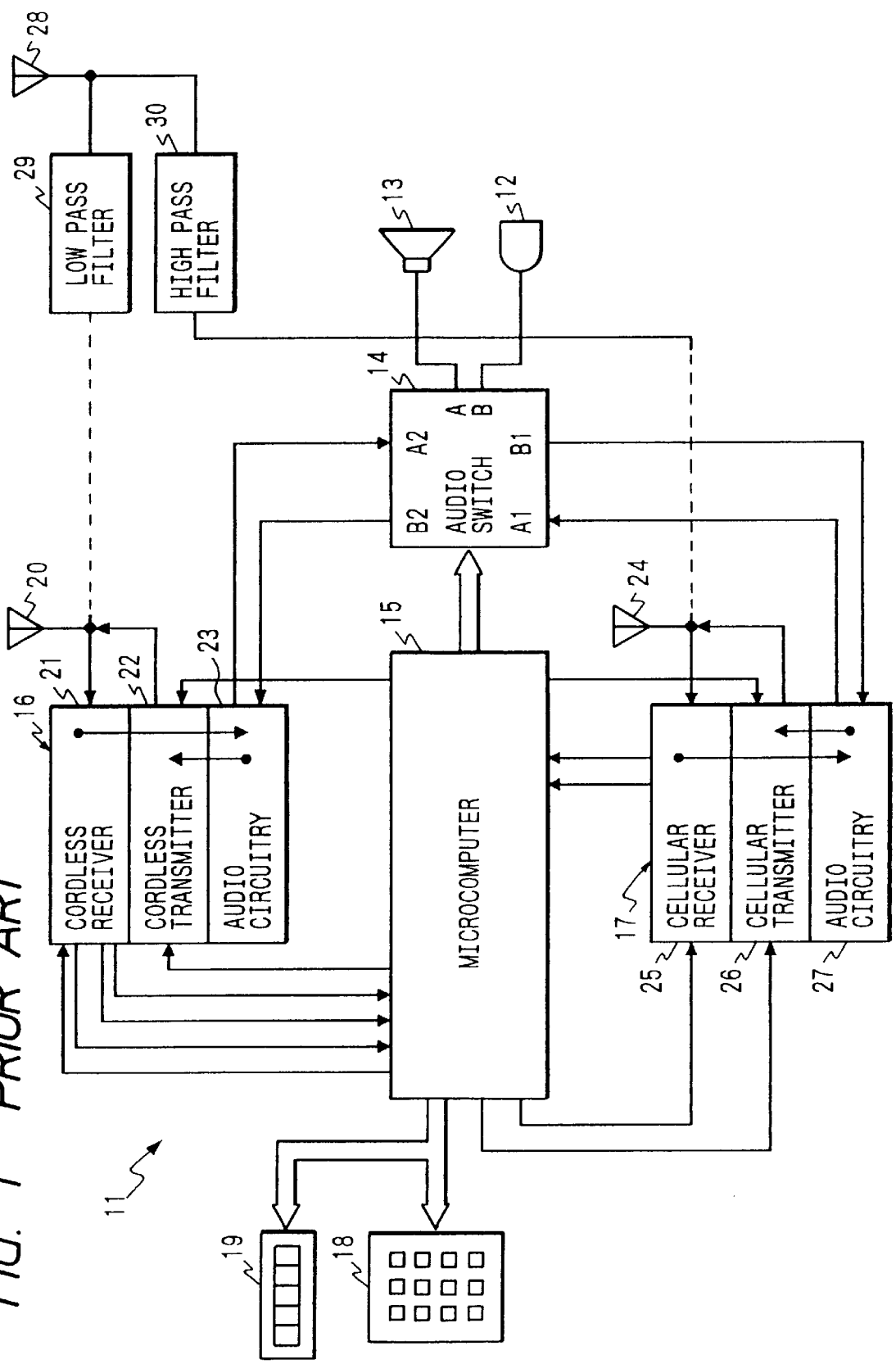
FIG. 1 is a block diagram of a conventional cellular and cordless telephone equipment.
Figure 2:
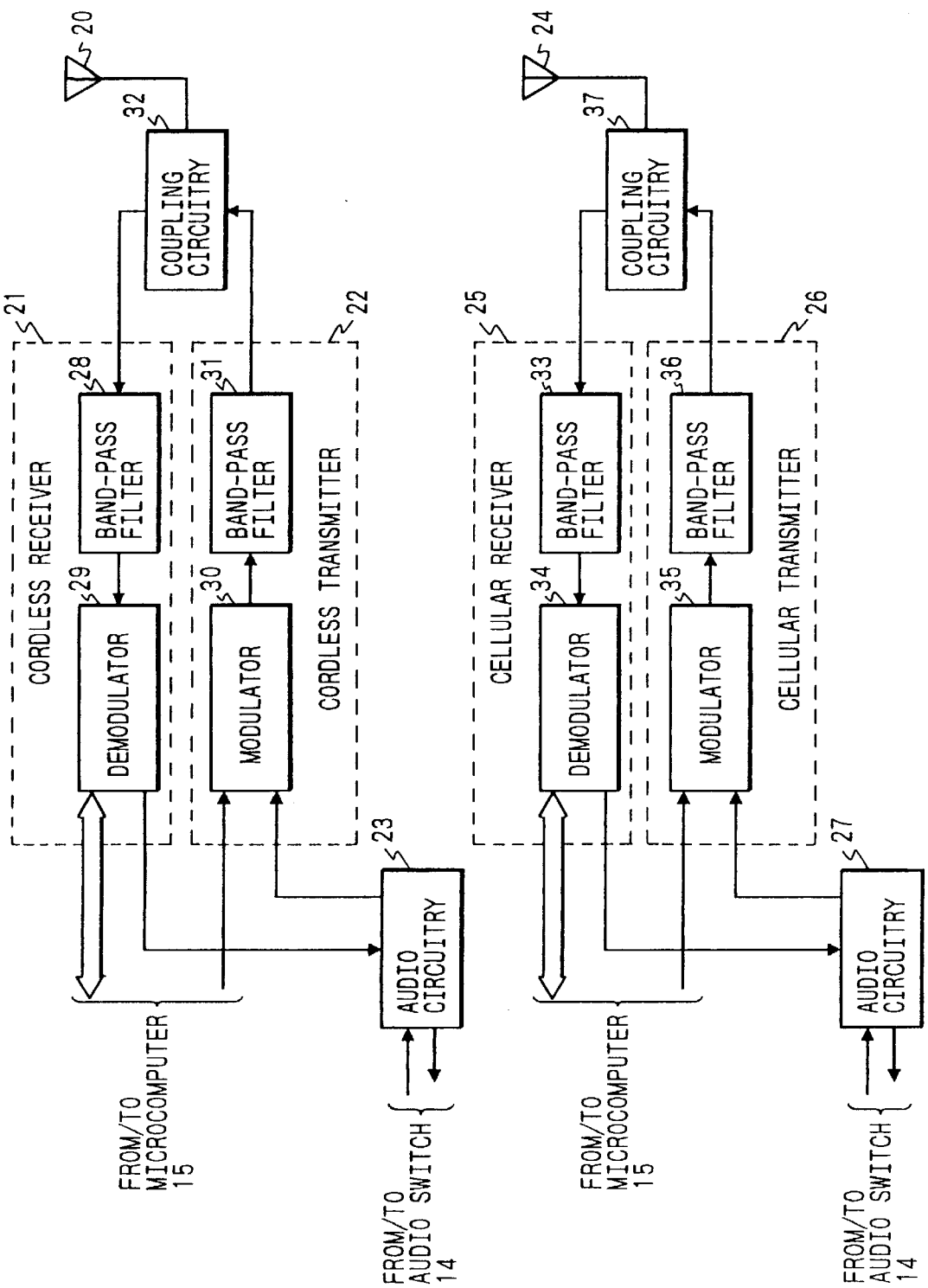
FIG. 2 is a block diagram of both a cordless telephone transceiver and a cellular telephone transceiver included in the conventional cellular and cordless telephone equipment shown in FIG. 1.
Figure 3:
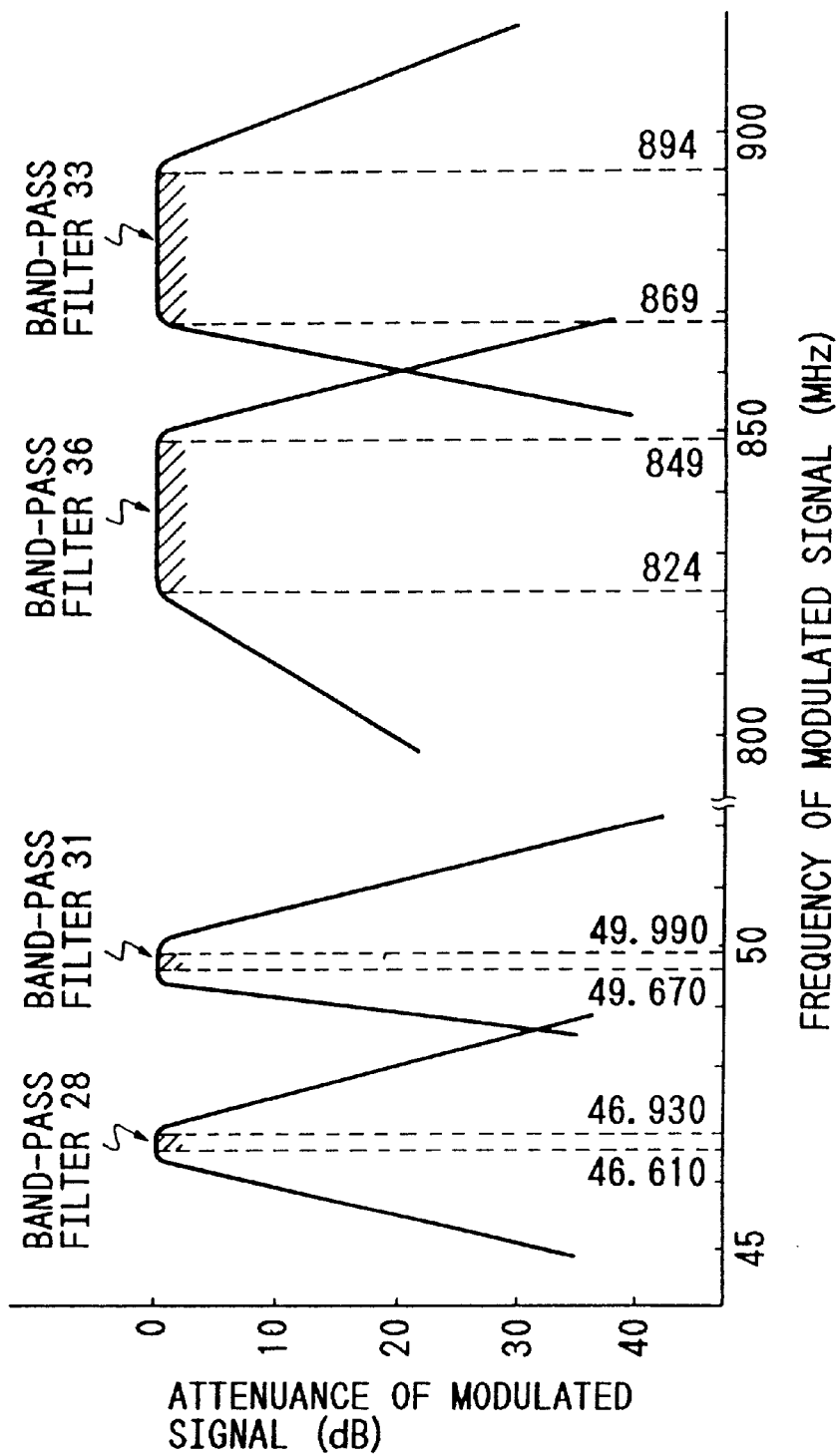
FIG. 3 graphically shows a relationship between a frequency of a modulated signal and attenuance of the modulated signal at each of band-pass filters included in the conventional cellular and cordless telephone equipment shown in FIG. 1.
Figure 4:
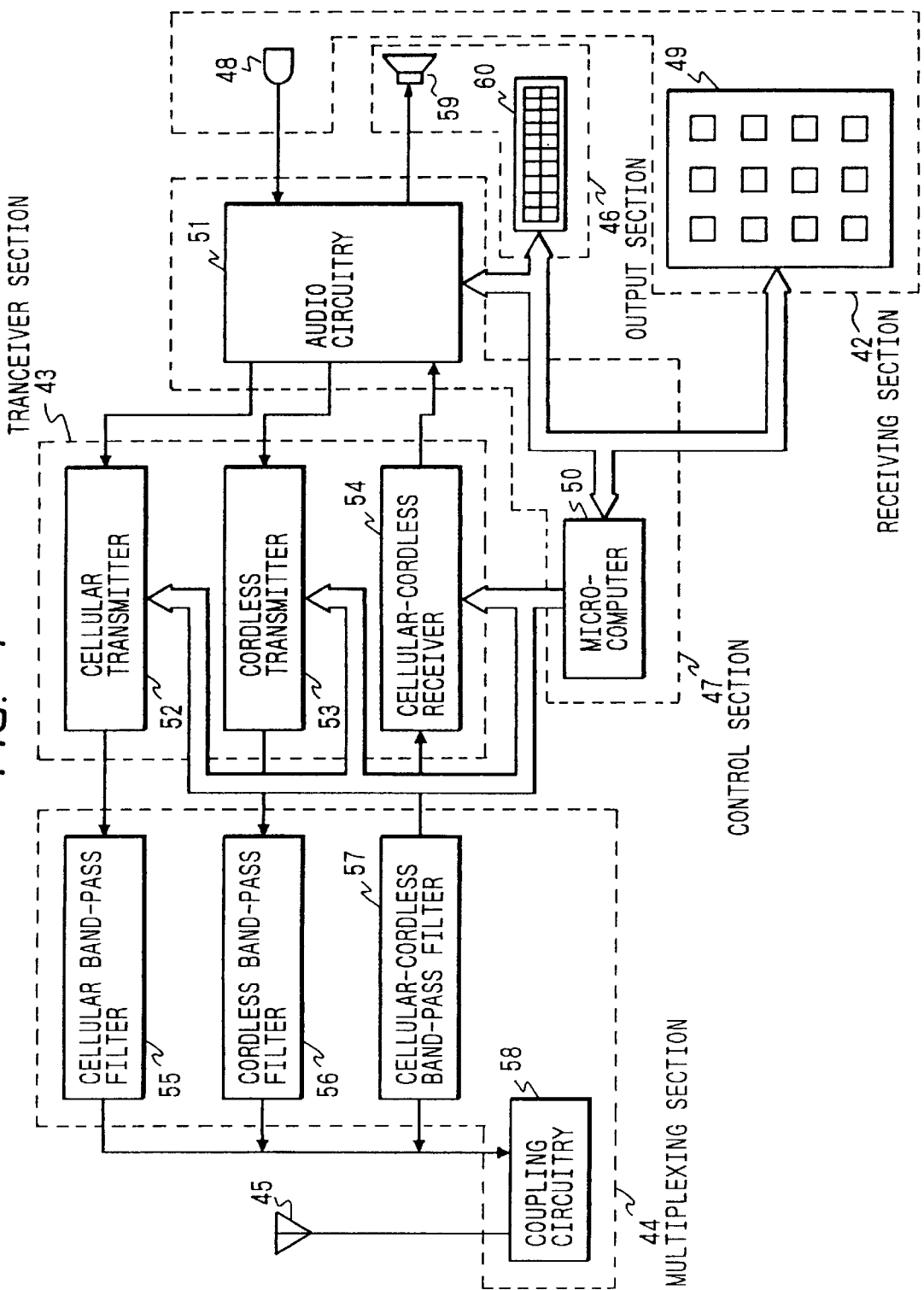
FIG. 4 is a block diagram of a wireless telephone equipment according to an embodiment.

FIG. 4 is a block diagram of a wireless telephone equipment according to an embodiment.

As shown in FIG. 4, a wireless telephone equipment according to a first embodiment comprises a receiving section 42 for receiving either audio signals of an outgoing call or pieces of control data signals of the outgoing call, a transceiver section 43 for modulating a carrier with the audio signals or the control data signals received in the receiving section 42 to a modulated signal of the outgoing call or demodulating a modulated signal of an incoming call transmitted from a sender to produce audio signals of the incoming call or control data signals of the incoming call, a multiplexing section 44 for multiplexing the modulated signal of the outgoing call produced in the transceiver section 43 in cellular telephone communication, the modulated signal of the outgoing call produced in the transceiver section 43 in cordless telephone communication, the modulated signal of the incoming call arranged to be demodulated in the transceiver section 43 in the cellular telephone communication, and the modulated signal of the incoming call arranged to be demodulated in the transceiver section 43 in the cordless telephone communication, an antenna 45 for transmitting the modulated signal of the outgoing call multiplexed in the multiplexing section 44 and receiving the modulated signal transmitted from the sender and arranged to be multiplexed in the multiplexing section 44, an output section 46 for outputting the audio signals of the incoming call or the control data signals of the incoming call which are demodulated in the transceiver section 43, and a control section 47 for controlling the receiving section 42, the transceiver section 43, and the output section 46 according to both the cordless telephone communication and the cellular telephone communication.

The receiving section 42 comprises a microphone 48 for receiving voice of a user, and a key-pad 49 for inputting a piece of information to instruct the microcomputer 47 to generate the control data signals. The voice of the user is changed to the audio signals in the microphone 48.

The control section 47 comprises a microcomputer 50 and an audio circuitry 51 for amplifying the audio signals of both the outgoing call and the incoming call under control of the microcomputer 50.

The transceiver section 43 comprises a cellular transmitter 52 for operating in the cellular telephone communication to transmit the audio signals or the control data signals of the outgoing call, a cordless transmitter 53 for operating in the cordless telephone communication to transmit the audio signals or the control data signals of the outgoing call, and a cellular-cordless receiver 54 for operating in both the cellular telephone communication and the cordless telephone communication to transmit the audio signals or the control data signals of the incoming call.

The multiplexing section 44 comprises a cellular band-pass pass filter 55 for filtering the modulated signal of the outgoing call produced in the cellular transmitter 52 in the cellular telephone communication, a cordless band-pass filter 56 for filtering the modulated signal of the outgoing call produced in the cordless transmitter 53 in the cordless telephone communication, a cellular and cordless band-pass filter 57 for filtering the modulated signal of the incoming call in both the cordless telephone communication, and a coupling circuitry 58 for multiplexing the modulated signals filtered in the cellular and cordless band-pass filters 55, 56 and the modulated signal received in the antenna 45.

Figure 5:
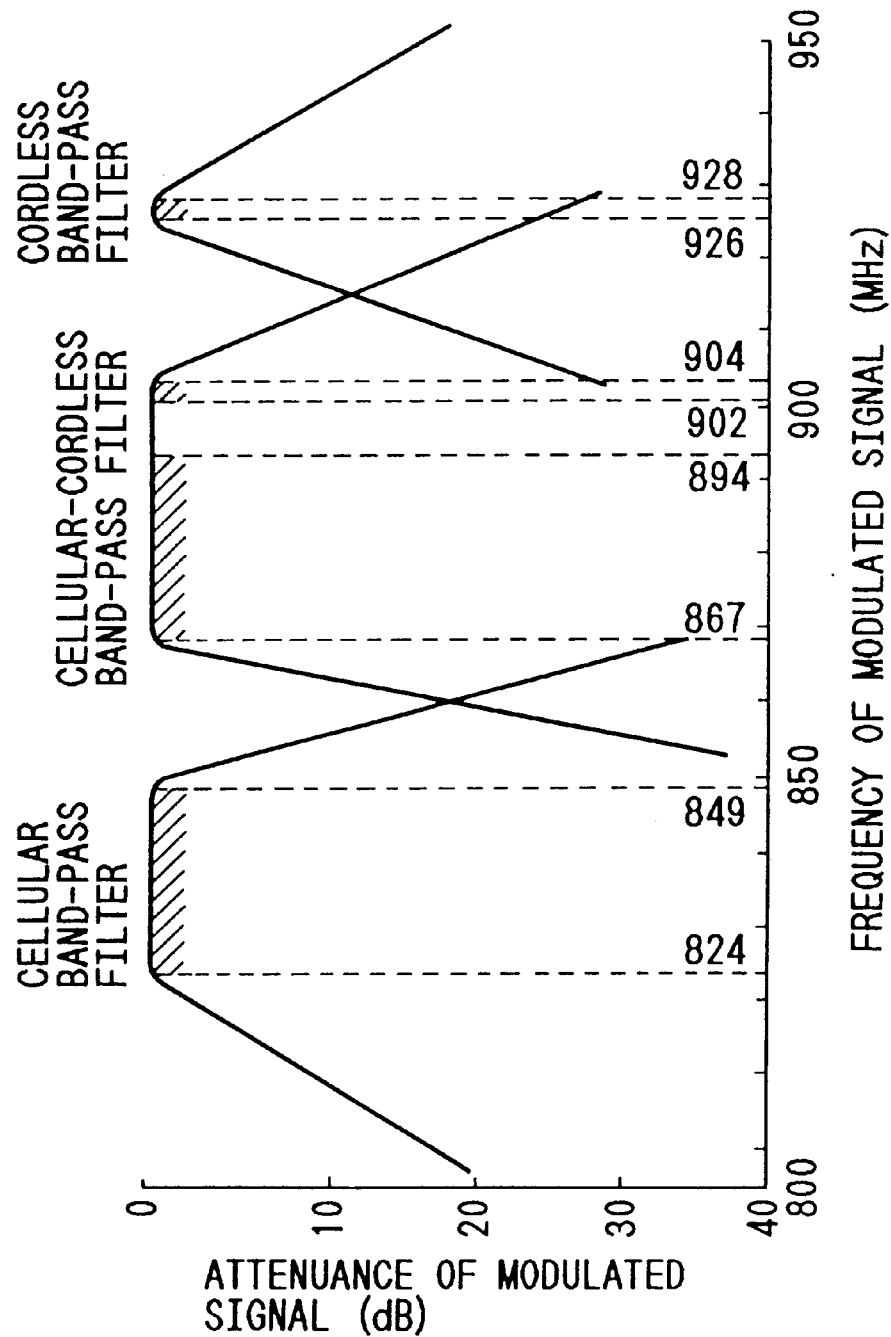
FIG. 5 graphically shows a relationship between a frequency of a modulated signal and attenuance of the modulated signal at each of band-pass filters included in the wireless telephone equipment shown in FIG. 4.

FIG. 5 graphically shows a relationship between a frequency of a modulated signal and attenuance of the modulated signal at each of band-pass filters 55, 56, 57 included in the wireless telephone equipment 41 shown in FIG. 4.

As shown in FIG. 5, frequency of the modulated signal filtered in the cellular band-pass filter 55 ranges from 824 MHz to 849 MHz. Therefore, a cellular transmitting frequency band ranges from 824 MHz to 849 MHz. Also, frequency of the modulated signal filtered in the cordless band-pass filter 56 ranges from 926 MHz to 928 MHz. Therefore, a cordless transmitting frequency band ranges from 926 MHz to 928 MHz.

In addition, frequency of the modulated signal filtered in the cellular-cordless band-pass filter 57 is limited in a combined cellular/cordless transmitting frequency band of a cellular receiving frequency band and a cordless receiving frequency band and ranges from 869 MHz to 904 MHz. The cellular receiving frequency band ranges from 869 MHz to 894 MHz, and the cordless receiving frequency band ranges from 902 MHz to 904 MHz.

Each of the frequency bands is divided into a large number of channels. For example, the cordless transmitting frequency band is divided into eighty channels (CH1 to CH80), and the cordless receiving frequency band is divided into eighty channels (CH1 to C80). The channels are arranged at frequency intervals 30 KHz in both the cellular telephone communication and the cordless telephone communication. Parts of channels are utilized to transmit or receive control data signals, and other parts of channels are utilized to transmit or receive audio signals. For example, CH1, CH17, CH33, CH49, CH65, and C80 of the cordless transmitting and receiving frequency bands are utilized to transmit or receive the control data signals. The control data signals denote, for example, an identification number of the equipment 41, a parameter provided to the equipment 41, and a telephone number of the receiver. The identification number and the parameter of the equipment 41 are automatically transmitted from the microcomputer 47 to the receiver. The telephone number is manually transmitted to the cellular or cordless base station by operating the key-pad 49. Also, in cases where the equipment is connected to an external computer, the telephone number is automatically transmitted from the external computer through the microcomputer 47 to the base station.

The output section 46 comprises a speaker 59 for giving the voice of the sender to the user, and a display 60 for displaying pieces of control data of the incoming call transferred through the microcomputer 50 in which the control data signals of the incoming call are changed to the control data.

In cases where the wireless telephone equipment 41 is positioned within call range of a cordless base station (not shown), the equipment 41 automatically operates as a cordless telephone under control of the microcomputer 50. That is, the cordless transmitter 53 and the cellular-cordless receiver 54 are respectively set in an operating condition, while the cellular transmitter 52 is set in a non-operating condition. Also, the microphone 48 and the speaker 59 are connected with the transmitter 53 and the receiver 54 through the audio circuitry 51.

In contrast, in cases where the wireless telephone equipment 41 moves out of the call range of the cordless base station, the equipment 41 automatically operates as a cellular telephone to communicate with a cellular telephone base station (not shown) under control of the microcomputer 50. That is, the cellular transmitter 52 and the cellular-cordless receiver 54 are respectively set in an operating condition, while the cordless transmitter 53 is set in a non-operating condition. Also, the microphone 48 and the speaker 59 are connected with the transmitter 52 and the receiver 54 through the audio circuitry 51.

FIG. 6 is a block diagram showing the transceiver section 43 of the wireless telephone equipment 41 shown in FIG. 4 in detail.

As shown in FIG. 6, the cellular transmitter 52 comprises a phase locked loop (PLL) frequency synthesizer 61 for modulating a carrier with the audio signals received in the microphone 48 or the control data signals generated in the microcomputer 50 to a modulated signal of the outgoing call under control of the microcomputer 50, a band-pass filter 62 for filtering the modulated signal produced in the PLL frequency synthesizer 61 to eliminate unnecessary noises in frequency bands other than the cellular transmitting frequency band ranging from 824 MHz to 849 MHz, a driver amplifier 63 for pre-amplifying the modulated signal filtered in the band-pass filter 62 to amplify the modulated signal in a power amplifier, a power amplifier 64 for amplifying the modulated signal pre-amplified in the driver amplifier 63, a directional coupler 65 for taking out a part of travelling-wave component of the modulated signal amplified in the power amplifier 64, an automatic power controller 66 for automatically controlling a power level of the modulated signal amplified in the power amplifier 64 while checking a power level of the modulated signal taken out in the directional coupler 65.

The modulation of the carrier in the PLL frequency synthesizer 61 is performed according to a frequency shift keying.

The power level of the modulated signal amplified in the power amplifier 64 is changed in six types of grades under control of the microcomputer 50.

The cordless transmitter 53 comprises a phase locked loop (PLL) frequency synthesizer 67 for modulating a carrier with the audio signals received in the microphone 48 or the control data signals generated in the microcomputer 50 to a modulated signal of the outgoing call under control of the microcomputer 50, an amplifier 68 for amplifying the modulated signal produced in the PLL frequency synthesizer 67, a band-pass filter 69 for filtering the modulated signal amplified in the amplifier 68 to eliminate unnecessary noises in frequency bands other than the cordless transmitting frequency band ranging from 926 MHz to 928 MHz, a power amplifier 70 for amplifying the modulated signal filtered in the band-pass filter 69.

The modulation of the carrier in the PLL frequency synthesizer 67 is performed according to a pulse modulation.

The cellular-cordless receiver 54 comprises a low noise amplifier 71 for amplifying the modulated signal filtered in the cellular-cordless band-pass filter 57 in low noise, a first band-pass filter 72 for filtering the modulated signal amplified in the low noise amplifier 71 to eliminate unnecessary noises in frequency bands other than both the cellular receiving frequency band ranging from 869 MHz to 894 MHz and the cordless receiving frequency band ranging from 902 MHz to 904 MHz, a phase locked loop (PLL) frequency synthesizer 73 for generating a first local signal to change the frequency of the modulated signal under control of the microcomputer 50, a first frequency converter 74 for converting a high frequency of the modulated signal filtered in the first band-pass filter 72 to a first intermediate frequency according to a heterodyne process by mixing the modulated signal with the first local signal generated in the PLL frequency synthesizer 73. The first intermediate frequency of a first intermediate-frequency signal produced in the first frequency converter 74 equals 83.16 MHz.

The cellular-cordless receiver 54 further comprises a second band-pass filter 75 for filtering the first intermediate-frequency signal produced in the first frequency converter 74 to eliminate unnecessary noises such as spurious, a local oscillator 76 for generating a second local signal to change the first intermediate frequency of the first intermediate-frequency signal, a second frequency converter 77 for converting the first intermediate frequency of the first intermediate-frequency signal produced in the first frequency converter 74 to a second intermediate frequency according to the heterodyne process by mixing the first intermediate signal with the second local signal generated in the local oscillator 76. The second intermediate frequency of a second intermediate-frequency signal produced in the second frequency converter 77 equals 455 KHz.

The cellular-cordless receiver 54 further comprises a third band-pass filter 78 for filtering the second intermediate-frequency signal produced in the second frequency converter 77 to eliminate unnecessary noises such as spurious, and a demodulator 79 for demodulating the second intermediate-frequency signal filtered in the third band-pass filter 78 to produce audio signals of the incoming call or control data signals of the incoming call.

In the above configuration of the wireless telephone equipment 41, various operations executed in the equipment 41 are described.

In cases where the equipment 41 operates as the cellular telephone, there are four types of operations in the equipment 41. A first operation is to receive control data signals carried on a modulated signal of an incoming call. A second operation is to receive audio signals carried on a modulated signal of an incoming call. A third operation is to transmit control data signals carried on a modulated signal of an outgoing call. A fourth operation is to transmit audio signals carried on a modulated signal of an outgoing call. One of the above four types of operations is selected by providing a piece of control information to the microcomputer 50 through the key-pad 49.

The first operation of the cellular telephone is initially described.

In cases where a user selects a control channel of an incoming call by inputting a piece of control information to the key-pad 49 to receive control data signals carried on a modulated signal of an incoming call, the cellular transmitter 52 and the cellular-cordless receiver 54 are respectively set in an operating condition under control of the microcomputer when the user is positioned out of the call range of the cordless base station. The control channel of the incoming call exists in the cellular receiving band ranging from 869 MHz to 894 MHz. Also, the cordless transmitter 53 is set in a non-operating condition under control of the microcomputer 50. That is, the wireless telephone equipment 41 is set in a first operating condition.

In cases where the wireless telephone equipment 41 is set in the first operating condition, the first local signal is generated in the PLL frequency synthesizer 73 in advance. The frequency of the first local signal is adjusted under control of the microcomputer 50 to synchronize the first local signal with the modulated signal of the control channel. Also, the second local signal is generated in the local oscillator 76 in advance to synchronize the second local signal with the first intermediate-frequency signal of which the frequency is 83.16 MHz.

Thereafter, when the modulated signal of the incoming call is received in the antenna 45, the modulated signal received is transferred through the coupling circuitry 58 to the cellular-cordless band-pass filter 57, the cellular band-pass filter 55, and the cordless band-pass filter 56. Because the frequency of the modulated signal ranges from 869 MHz to 894 MHz, the modulated signal passes through the cellular-cordless band-pass filter 57. In contrast, the modulated signal passes through neither the cellular band-pass filter 55 nor the cordless band-pass filter 56. As a result, the modulated signal of the incoming call is transferred to the cellular-cordless receiving section 54.

In the cellular-cordless receiving section 54, the modulated signal is amplified in the low noise amplifier 71, and filtered in the first band-pass filter 72. Thereafter, the modulated signal is converted to the first intermediate-frequency signal having the first intermediate frequency in the first frequency converter 74 because the modulated signal is mixed with the first local signal generated in the PLL frequency synthesizer 73. In this case, various unnecessary noises such as spurious are generated with the first intermediate-frequency signal, and the frequency of the various unnecessary noises is out of the first intermediate frequency of the first intermediate-frequency signal. Therefore, the various unnecessary noises are eliminated in the second band-pass filter 75.

Thereafter, the first intermediate-frequency signal is converted to the second intermediate-frequency signal having the second intermediate frequency in the second frequency converter 77 because the first intermediate-frequency signal, is mixed with the second local signal generated in the local oscillator 76. In this case, various unnecessary noises such as spurious are generated with the second intermediate-frequency signal, and the frequency of the various unnecessary noises is out of the second intermediate frequency of the second intermediate-frequency signal. Therefore, the various unnecessary noises are eliminated in the third band-pass filter 78. Thereafter, the second intermediate-frequency signal in which an intermediate frequency carrier is modulated with the control data signals of the incoming call is demodulated in the demodulator 79 to reproduce the control data signals. Thereafter, the control data signals of the incoming call are transferred to the audio circuitry 51. In the audio circuitry 51, because pieces of message data included in the control data signals are coded in a Manchester code, the control data signals are converted to a non-return-to-zero code. Also, bit synchronizing signals and word synchronizing signals are detected. Also, busy/idle bit signals are separrated from the control data signals. Thereafter, the message data and the busy/idle bit signals are transferred to the microcomputer 50. If necessary, the message data is displayed in the display 60.

Accordingly, in cases where the user selects the control channel of the incoming call when the user is positioned out of the call range of the cordless base station, the wireless telephone equipment 41 can be automatically set in the first operating condition under control of the microcomputer 50. Therefore, the user can reliably receive the control data from the sender regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

Next, the second operation of the cellular telephone is described.

In cases where a user selects an audio channel of an incoming call by inputting a piece of control information to the key-pad 49 to receive audio signals carried on a modulated signal of an incoming call, the cellular transmitter 52 and the cellular-cordless receiver 54 are respectively set in an operating condition under control of the microcomputer when the user is positioned out of the call range of the cordless base station. The audio channel of the incoming call exists in the cellular receiving band ranging from 869 MHz to 894 MHz. Also, the cordless transmitter 53 is set in a non-operating condition under control of the microcomputer 50. That is, the wireless telephone equipment 41 is set in a second operating condition.

In cases where the wireless telephone equipment 41 is set in the second operating condition, the first local signal is generated in the PLL frequency synthesizer 73 in advance. The frequency of the first local signal is adjusted under control of the microcomputer 50 to synchronize the first local signal with the modulated signal of the audio channel. Also, the second local signal is generated in the local oscillator 76 in advance to synchronize the second local signal with the first intermediate-frequency signal of which the frequency is 83.16 MHz.

Thereafter, when the modulated signal of the incoming call is received in the antenna 45, the modulated signal received is transferred to the cellular-cordless receiving section 54 through the coupling circuitry 58 and the cellular-cordless band-pass filter 57 in the same manner as the first operation.

In the cellular-cordless receiving section 54, the modulated signal is amplified in the low noise amplifier 71, and filtered in the first band-pass filter 72. Thereafter, the modulated signal having a high frequency is converted to the first intermediate-frequency signal having the first intermediate frequency in the first frequency converter 74 in the same manner as the first operation.

Thereafter, the first intermediate-frequency signal is transferred to the second band-pass filter 75 to eliminate various unnecessary noises, and the first intermediate-frequency signal is converted to the second intermediate-frequency signal having the second intermediate frequency in the second frequency converter 77 in the same manner as the first operation.

Thereafter, various unnecessary noises are eliminated in the third band-pass filter 78, and the second intermediate-frequency signal in which an intermediate frequency carrier is modulated with the audio signals of the incoming call is demodulated in the demodulator 79 to reproduce the audio signals. Thereafter, the audio signals of the incoming call are transferred to the audio circuitry 51. In the audio circuitry 51, the audio signals are amplified to generate audible voice in the speaker 59, so that the audible voice is given from the speaker 59.

Accordingly, in cases where the user selects the audio channel of the incoming call when the user is positioned out of the call range of the cordless base station, the wireless telephone equipment 41 can be automatically set in the second operating condition under control of the microcomputer 50. Therefore, the user can reliably hear the audible voice of the sender regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

Next, the third operation of the cellular telephone is described.

In cases where a user selects a control channel of an outgoing call by inputting a piece of control information to the key-pad 49 to send out pieces of control data to a receiver, the cellular transmitter 52 and the cellular-cordless receiver 54 are respectively set in an operating condition under control of the microcomputer when the user is positioned out of the call range of the cordless base station. The control channel of the outgoing call exists in the cellular transmitting band ranging from 824 MHz to 849 MHz. Also, the cordless transmitter 53 is set in a non-operating condition under control of the microcomputer 50. That is, the wireless telephone equipment 41 is set in a third operating condition.

In cases where the wireless telephone equipment 41 is set in the third operating condition, the power level of a modulated signal amplified in the power amplifier 64 is set in one of the six types of grades in advance by controlling the automatic power controller 66 under control of the microcomputer 50. The power level of the modulated signal can be changed by inputting a piece of control information to the key-pad 49.

Thereafter, when control data signals are generated in the microcomputer 47, the control data signals are transferred from the microcomputer 50 to the audio circuitry 51. In the audio circuitry 47, because the control data signals are coded in the non-return-to-zero code, the control data signals are converted to the Manchester code. Also, bit synchronizing signals and word synchronizing signals are added to the control data signals. Thereafter, the control data signals are transferred to the PLL frequency synthesizer 61.

In the PLL frequency synthesizer 61, a carrier, of which the frequency is specified according to the control channel of the outgoing call selected by the user, is modulated with the control data signals to a modulated signal of the outgoing call under control of the microcomputer 50. In this case, various unnecessary noises are generated with the modulated signal of the outgoing call, and the frequency of the various unnecessary noises is out of the frequency of the modulated signal. Therefore, the various unnecessary noises are eliminated in the band-pass filter 62. Thereafter, the modulated signal is pre-amplified in the driver amplifier 63 to prepare for the amplification of the modulated signal in the power amplifier 64, so that the modulated signal is amplified in the power amplifier 64.

A power level of the modulated signal amplified in the power amplifier 64 is controlled by the cooperation of the directional coupler 65 and the automatic power controller 66. In detail, when the modulated signal amplified in the power amplifier 64 is transferred to the cellular band-pass filter 55, a reflected wave is returned from the filter 55 to the power amplifier 64 because impedance matching between the power amplifier 64 and the filter 55 is not perfect. Therefore, a travelling-wave component of the modulated signal passing from the power amplifier 64 to the filter 55 and a reflected-wave component of the modulated signal passing from the filter 55 to the poer amplifier 64 pass through the directional coupler 65. The travelling-wave component of the modulated signal is only taken out to the directional coupler 65, and a power level of the travelling-wave component is checked in the automatic power controller 66. Thereafter, the power level of the modulated signal amplified in the power amplifier 64 is controlled by providing a control signal from the controller 66 to the power amplifier 64 under control of the microcomputer 50.

Thereafter, the modulated signal of which the power level is controlled is filtered in the cellular band-pass filter 55, and the modulated signal filtered is transferred to the antenna 45 through the coupling circuitry 58. Therefore, the modulated signal is transmitted to the receiver through a cellular telephone base station.

Accordingly, in cases where the user selects the control channel of the outgoing call when the user is positioned out of the call range of the cordless base station, the wireless telephone equipment 41 can be automatically set in the third operating condition under control of the microcomputer 50. Therefore, the user can reliably transmit the control data to the receiver regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

Next, the fourth operation of the cellular telephone is described.

In cases where a user selects an audio channel of an outgoing call by inputting a piece of control information to the key-pad 49 to send out voice of the user to a receiver, the cellular transmitter 52 and the cellular-cordless receiver 54 are respectively set in an operating condition under control of the microcomputer when the user is positioned out of the call range of the cordless base station. The audio channel of the outgoing call exists in the cellular transmitting band ranging from 824 MHz to 849 MHz. Also, the cordless transmitter 53 is set in a non-operating condition under control of the microcomputer 50. That is, the wireless telephone equipment 41 is set in a fourth operating condition.

When voice of the user is given to the microphone 42, audio signals relating to the voice are amplified in the audio circuitry 51. Thereafter, the audio signals are transferred to the PLL frequency synthesizer 61.

In the PLL frequency synthesizer 61, a carrier, of which the frequency is specified according to the audio channel of the outgoing call selected by the user, is modulated with the audio signals to a modulated signal of the outgoing call under control of the microcomputer 50. Thereafter, the modulated signal is transferred to the band-pass filter 62 to eliminate various unnecessary noises generated with the modulated signal in the same manner as the third operation. Thereafter, the modulated signal is pre-amplified in the driver amplifier 63 to prepare for the amplification of the modulated signal in the power amplifier 64, so that the modulated signal is amplified in the power amplifier 64. A power level of the modulated signal amplified in the power amplifier 64 is controlled by the cooperation of the directional coupler 65 and the automatic power controller 66 in the same manner as the third operation.

Thereafter, the modulated signal of which the power level is controlled is filtered in the cellular band-pass filter 55, and the modulated signal filtered is transferred to the antenna 45 through the coupling circuitry 58. Therefore, the modulated signal is transmitted to the receiver through a cellular telephone base station.

Accordingly, in cases where the user selects the audio channel of the outgoing call when the user is positioned out of the call range of the cordless base station, the wireless telephone equipment 41 can be automatically set in the fourth operating condition under control of the microcomputer 50. Therefore, the user can reliably transmit his voice to the receiver regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

In contrast, in cases where the equipment 41 is positioned within the call range of the cordless base station, the equipment 41 operates as the cordless telephone. In this case, there are four types of operations in the equipment 41. A first operation is to receive control data signals carried on a modulated signal of an incoming call. A second operation is to receive audio signals carried on a modulated signal of an incoming call. A third operation is to transmit control data signals carried on a modulated signal of an outgoing call. A fourth operation is to transmit audio signals carried on a modulated signal of an outgoing call. One of the above four types of operations is selected by providing a piece of control information to the microcomputer 50 through the key-pad 49.

The first operation of the cordless telephone is initially described.

In cases where a user selects a control channel of an incoming call by inputting a piece of control information to the key-pad 49 to receive control data signals carried on a modulated signal of an incoming call, the cordless transmitter 53 and the cellular-cordless receiver 54 are respectively set in an operating condition under control of the microcomputer when the user is positioned within the call range of the cordless base station. The control channel exists in the cordless receiving band ranging from 902 MHz to 904 MHz. Also, the cellular transmitter 52 is set in a non-operating condition under control of the microcomputer 50. That is, the wireless telephone equipment 41 is set in a first operating condition of the cordless telephone.

In cases where the wireless telephone equipment 41 is set in the first operating condition, the first local signal is generated in the PLL frequency synthesizer 73 in advance. The frequency of the first local signal is adjusted under control of the microcomputer 50 to synchronize the first local signal with the modulated signal of the control channel. Also, the second local signal is generated in the local oscillator 76 in advance to synchronize the second local signal with the first intermediate-frequency signal of which the frequency is 83.16 MHz.

Thereafter, when the modulated signal of the incoming call is received in the antenna 45, the modulated signal received is transferred through the coupling circuitry 58 to the cellular-cordless band-pass filter 57, the cellular band-pass filter 55, and the cordless band-pass filter 56. Because the frequency of the modulated signal ranges from 902 MHz to 904 MHz, the modulated signal passes through the cellular-cordless band-pass filter 57. In contrast, the modulated signal pass through neither the cellular band-pass filter 55 nor the cordless band-pass filter 56. As a result, the modulated signal of the incoming call is transferred to the cellular-cordless receiving section 54.

In the cellular-cordless receiving section 54, the modulated signal is amplified in the low noise amplifier 71, and filtered in the first band-pass filter 72. Thereafter, the modulated signal is converted to the first intermediate-frequency signal having the first intermediate-frequency in the first frequency converter 74. Thereafter, the first intermediate-frequency signal is transferred to the second band-pass filter 75 to eliminate various unnecessary noises. Thereafter, the first intermediate-frequency signal is converted to the second intermediate-frequency signal having the second intermediate frequency in the second frequency converter 77. Thereafter, the second intermediate-frequency signal is transferred to the third band-pass filter 78 to eliminate various unnecessary noises. Thereafter, the second intermediate-frequency signal is demodulated in the demodulator 79 to reproduce the control data signals of the incoming call. Thereafter, the control data signals are transferred to the microcomputer 50 through the audio circuitry 51. If necessary, pieces of message data contained in the control data signals are displayed in the display 60.

Accordingly, in cases where the user selects the control channel of the incoming call when the user is positioned within the call range of the cordless base station, the wireless telephone equipment 41 can be automatically set in the first operating condition of the cordless telephone under control of the microcomputer 50. Therefore, the user can reliably receive the control data from the sender regardless of whether the user is positioned within the call range of the cordless base station. In other words, the user can easily operate the equipment 41.

Also, because the cellular transmitting section 52 is automatically set in the non-operation condition, electric power consumed in the equipment 41 can be reduced.

Next, the second operation of the cordless telephone is described.

In cases where a user selects an audio channel of an incoming call by inputting a piece of control information to the key-pad 49 to receive audio signals carried on a modulated signal of an incoming call, the cordless transmitter 53 and the cellular-cordless receiver 54 are respectively set in an operating condition under control of the microcomputer 50 when the user is positioned within the call range of the cordless base station. The audio channel of the incoming call exists in the cordless receiving band ranging from 902 MHz to 904 MHz. Also, the cellular transmitter 52 is set in a non-operating condition under control of the microcomputer 50. That is, the wireless telephone equipment 41 is set in a second operating condition of the cordless telephone.

In cases where the wireless telephone equipment 41 is set in the second operating condition, the first local signal is generated in the PLL frequency synthesizer 73 in advance. The frequency of the first local signal is adjusted under control of the microcomputer 50 to synchronize the first local signal with the modulated signal of the audio channel. Also, the second local signal is generated in the local oscillator 76 in advance to synchronize the second local signal with the first intermediate-frequency signal of which the frequency is 83.16 MHz.

Thereafter, when the modulated signal of the incoming call is received in the antenna 45, the modulated signal received is transferred to the cellular-cordless receiving section 54 through the coupling circuitry 58 and the cellular-cordless band-pass filter 57 in the same manner as the first operation.

In the cellular-cordless receiving section 54, the modulated signal is amplified in the low noise amplifier 71, and filtered in the first band-pass filter 72. Thereafter, the modulated signal having a high frequency is converted to the first intermediate-frequency signal having the first intermediate frequency in the first frequency converter 74 in the same manner as the first operation of the cordless telephone.

Thereafter, the first intermediate-frequency signal is transferred to the second band-pass filter 75 to eliminate various unnecessary noises, and the first intermediate-frequency signal is converted to the second intermediate-frequency signal having the second intermediate frequency in the second frequency converter 77 in the same manner as the first operation of the cordless telephone.

Thereafter, various unnecessary noises are eliminated in the third band-pass filter 78, and the second intermediate-frequency signal in which an intermediate frequency carrier is modulated with the audio signals of the incoming call is demodulated in the demodulator 79 to reproduce the audio signals of the incoming call. Thereafter, the audio signals are transferred to the audio circuitry 51. In the audio circuitry 51, the audio signals are amplified to generate audible voice in the speaker 59, so that the audible voice is given from the speaker 59.

Accordingly, in cases where the user selects the audio channel of the incoming call when the user is positioned within the call range of the cordless base station, the wireless telephone equipment 41 can be automatically set in the second operating condition of the cordless telephone under control of the microcomputer 50. Therefore, the user can reliably hear the audible voice of the sender regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

Next, the third operation of the cordless telephone is described.

In cases where a user selects a control channel of an outgoing call by inputting a piece of control information to the key-pad 49 to send out pieces of control data to a receiver, the cordless transmitter 53 and the cellular-cordless receiver 54 are respectively set in an operating condition under control of the microcomputer when the user is positioned out of the call range of the cordless base station. The control channel of the outgoing call exists in the cordless transmitting band ranging from 926 MHz to 928 MHz. Also, the cellular transmitter 52 is set in a non-operating condition under control of the microcomputer 50. That is, the wireless telephone equipment 41 is set in a third operating condition of the cordless telephone.

In cases where the wireless telephone equipment 41 is set in the third operating condition, the power level of a modulated signal amplified in the power amplifier 64 is set in one of the six types of grades in advance by controlling the automatic power controller 66 under control of the microcomputer 50. The power level of the modulated signal can be changed by inputting a piece of control information to the key-pad 49.

Thereafter, when control data signals are generated in the microcomputer 47, the control data signals are transferred from the microcomputer 50 to the PLL frequency synthesizer 61 through the audio circuitry 51.

In the PLL frequency synthesizer 61, a carrier, of which the frequency is specified according to the control channel of the outgoing call selected by the user, is modulated with the control data signals to a modulated signal of the outgoing call under control of the microcomputer 50. Thereafter, the modulated signals are transferred to the band-pass filter 62 to eliminate various unnecessary noises generated with the modulated signal of the outgoing call. Thereafter, the modulated signal is pre-amplified in the driver amplifier 63 to prepare for the amplification of the modulated signal in the power amplifier 64, so that the modulated signal is amplified in the power amplifier 64.

A power level of the modulated signal amplified in the power amplifier 64 is controlled by the cooperation of the directional coupler 65 and the automatic power controller 66. Thereafter, the modulated signal of which the power level is controlled is filtered in the cordless band-pass filter 56, and the modulated signal filtered is transferred to the antenna 45 through the coupling circuitry 58. Therefore, the modulated signal is transmitted to the receiver through a cordless base station.

Accordingly, in cases where the user selects the control channel of the outgoing call when the user is positioned within the call range of the cordless base station, the wireless telephone equipment 41 can be automatically set in the third operating condition of the cordless telephone under control of the microcomputer 50. Therefore, the user can reliably transmit the control data to the receiver regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

Next, the fourth operation of the cordless telephone is described.

In cases where a user selects an audio channel of an outgoing call by inputting a piece of control information to the key-pad 49 to send out voice of the user to a receiver, the cordless transmitter 53 and the cellular-cordless receiver 54 are respectively set in an operating condition under control of the microcomputer when the user is positioned within the call range of the cordless base station. The audio channel of the outgoing call exists in the cordless transmitting band ranging from 926 MHz to 928 MHz. Also, the cellular transmitter 52 is set in a non-operating condition under control of the microcomputer 50. That is, the wireless telephone equipment 41 is set in a fourth operating condition of the cordless telephone.

When voice of the user is given to the microphone 42, audio signals relating to the voice are amplified in the audio circuitry 51. Thereafter, the audio signals are transferred to the PLL frequency synthesizer 61.

In the PLL frequency synthesizer 61, a carrier, of which the frequency is specified according to the audio channel of the outgoing call selected by the user, is modulated with the audio signals to a modulated signal of the outgoing call under control of the microcomputer 50. Thereafter, the modulated signal is transferred to the band-pass filter 62 to eliminate various unnecessary noises generated with the modulated signal in the same manner as the third operation. Thereafter, the modulated signal is pre-amplified in the driver amplifier 63 to prepare for the amplification of the modulated signal in the power amplifier 64, so that the modulated signal is amplified in the power amplifier 64. A power level of the modulated signal amplified in the power amplifier 64 is controlled by the cooperation of the directional coupler 65 and the automatic power controller 66 in the same manner as the third operation.

Thereafter, the modulated signal of which the power level is controlled is filtered in the cordless band-pass filter 56, and the modulated signal filtered is transferred to the antenna 45 through the coupling circuitry 58. Therefore, the modulated signal is transmitted to the receiver through a cordless base station.

Accordingly, in cases where the user selects the audio channel of the outgoing call when the user is positioned within the call range of the cordless base station, the wireless telephone equipment 41 can be automatically set in the fourth operating condition of the cordless telephone under control of the microcomputer 50. Therefore, the user can reliably transmit his voice to the receiver regardless of whether the user is positioned within the call range of the cordless base station. In other words, the user can easily operate the equipment 41.

Also, because the cordless transmitting section 53 is automatically set in the non-operation condition, electric power consumed in the equipment 41 can be reduced.

As is described in the first and second operations in which the wireless telephone equipment 41 operates as the cellular telephone and in the first and second operations in which the wireless telephone equipment 41 operates as the cordless telephone, in cases where the audio signals or the control data signals of the incoming call are received in the equipment 41, the cellular-cordless band-pass filter 57 and the cellular-cordless receiver 54 operate in common regardless of whether the wireless telephone equipment 41 operates as the cellular telephone or the cordless telephone. In addition, the audio circuitry 51 operates in common in the first to fourth operations of the cellular telephone and the first to fourth operations of the cordless telephone.

Accordingly, a small-sized and lightweight wireless telephone equipment 41 can be manufactured at moderate cost.

Also, because the frequency of the carrier modulated with the control data signals or the audio signals is reduced in two stages in the first and second frequency converters 74, 77, receiving sensitivity of the control data signals and the audio signals can be stably enhanced.

Also, because the power level of the modulated signal produced in the PLL frequency synthesizer 61 is automatically controlled by utilizing the automatic power controller 66 under control of the microcomputer 50, the modulated signals can be reliably transmitted to the cellular telephone base station even though the cellular telephone base station is far from the user.

Also, because the power level of the modulated signal produced in the PLL frequency synthesizer 67 is amplified in two stages in the amplifiers 68, 70, the modulated signal can be reliably transmitted to the cordless base station.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A wireless telephone equipment comprising:

signal generation means for generating a first information signal of an outgoing call;

first transmitting means for modulating a first carrier with the first information signal generated by the signal generation means to produce a first modulated signal, wherein a frequency of the first carrier is in a first frequency band corresponding to a cellular frequency band;

second transmitting means for modulating a second carrier with the first information signal generated by the signal generation means to produce a second modulated signal, wherein a frequency of the second carrier is in a second frequency band corresponding to a cordless frequency band that is different from the first frequency band of the first carrier;

antenna means for transmitting either the first modulated signal produced in the first transmitting means or the second modulated signal produced in the second transmitting means and receiving a third modulated signal in which a third carrier is modulated with a second information signal of an incoming call, wherein a frequency of the third carrier is in a third frequency band corresponding to a combined cellular/cordless frequency band that is different from both the first frequency band of the first carrier and the second frequency band of the second carrier;

a single demodulating circuit for demodulating the third modulated signal received in the antenna means to reproduce the second information signal of the incoming call;

outputting means for outputting the second information signal reproduced in the demodulating circuit; and control means for controlling the operation of the first transmitting means, the second transmitting means, and the demodulating circuit.

2. An equipment according to claim 1 in which the first transmitting means operates in a cordless telephone communication, the second transmitting means operates in a cellular telephone communication, and the demodulating circuit operates in both the cordless telephone communication and the cellular telephone communication, the cordless telephone communication being performed under control of the control means in cases where the wireless telephone equipment is positioned within call range of a cordless base station, and the cellular telephone communication being performed under control of the control means in cases where the wireless telephone equipment is positioned out of the call range of the cordless base station.

3. An equipment according to claim 1 in which the first frequency band of the first carrier ranges from 824 MHz to 849 MHz, the second frequency band of the second carrier ranges from 926 MHz to 928 MHz, and the third frequency band of the third carrier ranges from 869 MHz to 904 MHz.

4. An equipment according to claim 1 in which the signal generation means is a microphone in which voice of a user is changed to the first information signal, and the output means is a speaker in which the second information signal is changed to voice of a sender.

5. An equipment according to claim 1 in which the first transmitting means comprises a phase locked loop frequency synthesizer for modulating the first carrier with the first information signal to produce the first modulated signal, a band-pass filter for filtering the first information signal to eliminate unnecessary noises which are generated with the first modulated signal in the phase locked loop frequency synthesizer, and a power amplifier for amplifying a power level of the first modulated signal produced in the phase locked loop frequency synthesizer.

6. An equipment according to claim 1 in which the second transmitting means comprises a phase locked loop frequency synthesizer for modulating the first carrier with the first information signal to produce the first modulated signal, a band-pass filter for filtering the first information signal to eliminate unnecessary noises which are generated with the first modulated signal in the phase locked loop frequency synthesizer, a power amplifier for amplifying a power level of the first modulated signal produced in the phase locked loop frequency synthesizer, a directional coupler for taking out a part of travelling-wave component of the modulated signal amplified in the power amplifier, and an automatic power controller for automatically controlling the power level of the modulated signal amplified in the power amplifier under control of the control means according to a power level of the modulated signal taken out in the directional coupler.

7. An equipment according to claim 1 in which the demodulating circuit comprises a first frequency converter for converting the frequency of the third carrier to an first intermediate frequency of a first intermediate-frequency signal, a first intermediate frequency band-pass filter for filtering the first intermediate-frequency signal to eliminate unnecessary noises which are generated with the first intermediate-frequency signal in the first frequency converter, a second frequency converter for converting the frequency of the first intermediate-frequency signal to a second intermediate frequency of a second intermediate-frequency signal, a second intermediate frequency band-pass filter for filtering the second intermediate-frequency signal to eliminate unnecessary noises which are generated with the second intermediate-frequency signal in the second frequency converter, and a demodulator for demodulating the second intermediate-frequency signal to reproduce the second information signal of the incoming call.

8. An equipment according to claim 1, additionally including:

a first transmitting band-pass filter for filtering the first modulated signal produced in the first transmitting means, the first modulated signal in the first frequency band of the first carrier passing through the first transmitting band-pass filter and being transferred to the antenna;

a second transmitting band-pass filter for filtering the second modulated signal produced in the second transmitting means, the second modulated signal in the second frequency band of the second carrier passing through the second transmitting band-pass filter and being transferred to the antenna; and a receiving band-pass filter for filtering the third modulated signal received in the antenna, the third modulated signal in the third frequency band of the third carrier passing through the receiving band-pass filter and being transferred to the demodulating circuit.

9. An equipment according to claim 1 in which the second information signal of the incoming call demodulated in the demodulating circuit is modulated by a cellular receiving carrier of which frequency is in a cellular receiving frequency band in cases where a cellular telephone communication is performed, and the second information signal of the incoming call demodulated in the demodulating circuit is modulated by a cordless receiving carrier of which frequency is in a cordless receiving frequency band differing from the cellular receiving frequency band in cases where a cordless telephone communication is performed.

* * * * *